(12) United States Patent
Patel

(10) Patent No.: US 6,918,035 B1
(45) Date of Patent: Jul. 12, 2005

(54) METHOD FOR TWO-PARTY AUTHENTICATION AND KEY AGREEMENT

(75) Inventor: Sarvar Patel, Montville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1071 days.

(21) Appl. No.: 09/127,767

(22) Filed: Jul. 31, 1998

(51) Int. Cl.[7] ................................................. H04L 9/00
(52) U.S. Cl. ....................... 713/169; 713/156; 713/168; 713/169; 713/202; 380/247; 380/248; 380/249; 455/411
(58) Field of Search ................................ 380/247–249; 713/156, 168, 169, 202; 455/411

(56) References Cited

U.S. PATENT DOCUMENTS

| | | | |
|---|---|---|---|
| 5,153,919 A | | 10/1992 | Reeds, III et al. |
| 5,351,293 A | * | 9/1994 | Michener et al. ............ 713/171 |
| 5,371,794 A | * | 12/1994 | Diffie et al. ................ 713/156 |
| 5,515,439 A | * | 5/1996 | Bantz et al. ................ 713/156 |
| 5,559,886 A | * | 9/1996 | Dent et al. .................. 380/247 |
| 5,577,121 A | | 11/1996 | Davis et al. |
| 5,594,795 A | * | 1/1997 | Dent et al. .................. 380/247 |
| 5,659,617 A | * | 8/1997 | Fischer ....................... 380/258 |
| 5,841,866 A | * | 11/1998 | Bruwer et al. ................ 705/66 |
| 5,991,617 A | * | 11/1999 | Powell ........................ 455/410 |
| 6,014,085 A | * | 1/2000 | Patel .......................... 455/410 |

FOREIGN PATENT DOCUMENTS

| | | |
|---|---|---|
| DE | 19523466 | 4/1997 |
| WO | WO9826534 | 6/1998 |

OTHER PUBLICATIONS

Menezes et al, Handbook of Applied Cryptography, Section 10.3, pp. 397–405, 1996.*
International Search Report for EP 99 30 5704 Mailed Dec. 22, 2000.
M. Bellare and P. Rogaway, Entity authentication and key distribution, *Advances in Cryptology—Crypto*, 1993.
S. Bellovin and M. Merritt, Encrypted key exchange: password–based protocols secure against dictionary attacks, *IEEE computer society symposium on research in security and privacy*, 72–84 May 1992.
R. Bird, I. Gopal, A. Herzberg, P. Janson, S. Kutten, R. Molva, and M. Yung, Systematic design of two–party authentication protocols, *Advances in Cryptology—Crypto*, 1991.
M. Blum and S. Micali, How to generate cryptographically strong sequences of pseudo random bits, *SIAM J. Computing*, 13 No. 4:850–864, 1984.

(Continued)

*Primary Examiner*—Andrew Caldwell
*Assistant Examiner*—Paul E. Callahan

(57) ABSTRACT

According to the two party authentication method, a first party generates and transfers a random number to a second party as a first challenge. The second party increments a count value in response to the first challenge, generates a first challenge response by performing a keyed cryptographic function (KCF) on the first challenge and the count value using a first key, and transfers the count value, as a second challenge, and the first challenge response to the first party. The first party verifies the second party based on the first challenge, the second challenge and the first challenge response. The first party also generates a second challenge response by performing the KCF on the second challenge using the first key, and transfers the second challenge response to the second party. The second party verifies the first party based on the second challenge and the second challenge response. For instance, the first and second parties can be a network and mobile, respectively, in a wireless system. Also, based on the first and second challenges, both the first and second parties may generate another key.

17 Claims, 2 Drawing Sheets

OTHER PUBLICATIONS

R. B. Boppana and R. Hirschfeld, Pseudorrandom generators and complexity classes, *Advances in Computing Research*, 5 (S. Micali, Ed.), JAI Press, CT.

U.S. Department of Commerce/N.I.S.T., *Digital Signature Standard*, FIPS 186, May 1994.

O. Goldreich and L. A. Levin, A hard–core predicate for all one way functions, *Proceedings of 21$^{st}$ STOC*, 25–32, 1989.

S. Goldwasser and A. Micali, Probabilistic encryption, *Journal of Computer and Systems Science*, 28: 270–299, 1984.

L. Gong, T. Lomas, R. Needham and J. Saltzer, Protecting poorly chosen secrets from guessing attacks, *IEEE Journal on Selected Areas in Communications*, 11(5): 648–656, Jun. 1993.

EIA/TIA, Cellular RadioTelecommunications Intersystem Operations IS–41 Rev. D, 1997.

T. Lomas, L. Gong, J. Saltzer and R. Needham, Reducing Risks from Poorly Chosen Keys, *Proceedings of the 12$^{th}$ ACM Symposium on Operating System Principles, ACM Operating Systems Review*, 23(5): 14–18, Dec. 1989.

S. Patel, Information Leakage in Encrypted Key Exchange, *Proceedings of DIMACS workshop on Network Threats*, 38: 33–40, Dec. 1996.

S. Patel, Number theoretic attacks on secure password schemes, *IEEE symposium on security and privacy*, 236–247, May 1997.

S. Patel, Weaknesses of the north american wireless authentication protocol, *IEEE Personal Communications*, 40–44, Jun. 1997.

A. C. Yao, Theory and applications of trapdoor functions, *Proceedings of 23$^{rd}$ FOCD*, 80–91, 1982.

M. Beller, L. Chang and Y. Yacobi, Privacy and authentication on a portable communication system, *IEEE J. Selected Areas in Communications*, 11(6): 821–829, 1993.

C. Carroll, Y. Frankel and Y. Tsiounis, Efficient key distribution for slow computing devices: Achieving fast over the air activation for wireless systems, *IEEE symposium on security and privacy*, May 1998.

TIA/EIA Interim Standard, *Over–the Air Service Provisioning of Mobile Stations in Spread Spectrum Systems*, IS–683–A, Jun. 1998.

E. Blossom, The VPI Protocol for Voice Privacy Devices, Dec. 1996.

O. Goldreich, S. Goldwasser and A. Micali, On the cryptographic applications of random functions, *Advances in Cryptology—Crypto*, 1984.

D. Jablon, Strong Password–Only Authenticated Key Exchange, *ACM SIG–COMM Computer Communications Review*, Oct. 1996.

S. Lucks, Open Key Exchange: How to defeat dictionary attacks without encrypting public keys, Proceedings of the Security Protocol Workshop '97, 1997.

Oded Goldreich, Shafi Goldwasser, Silvio Micali, How to Construct Random Functions, Journal of the Association for Computing Machinery, vol. 33, No. 4, pp. 792–807, Oct. 1986.

* cited by examiner

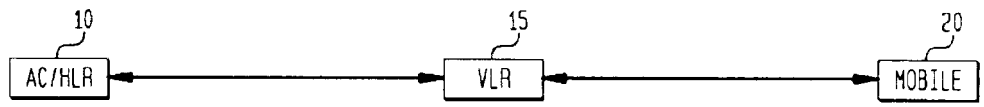
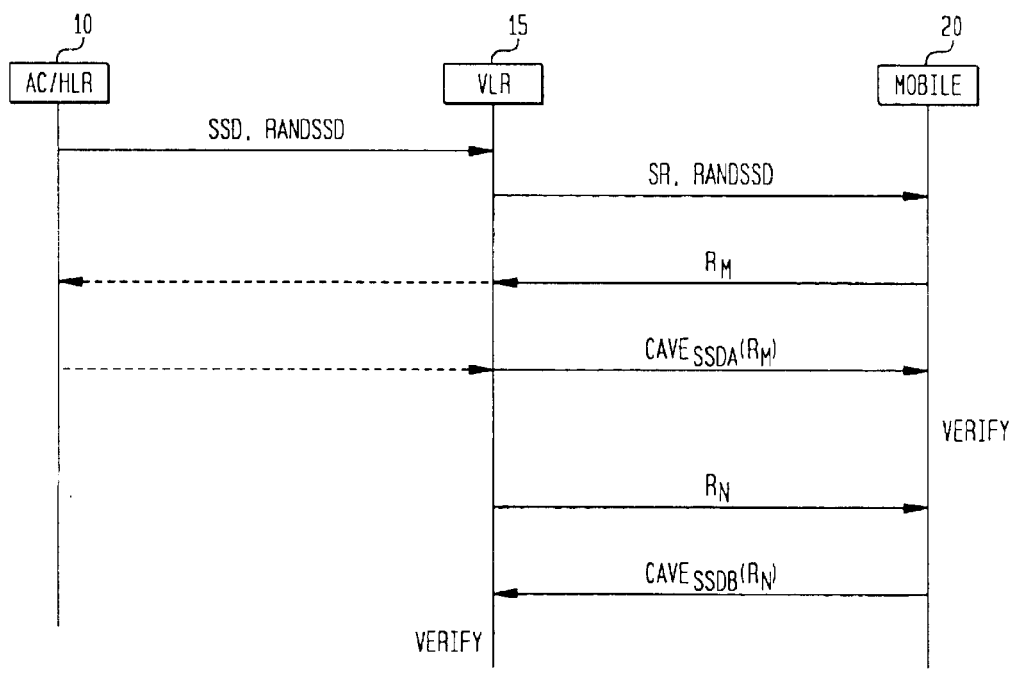

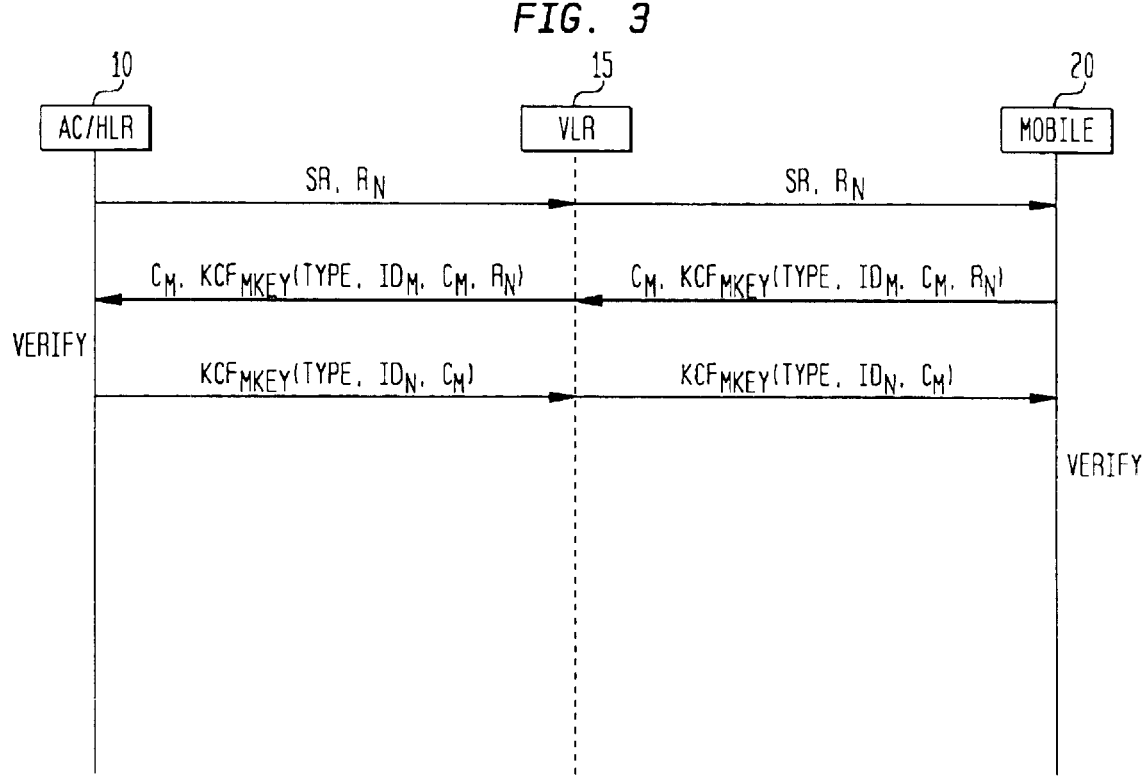

METHOD FOR TWO-PARTY AUTHENTICATION AND KEY AGREEMENT

RELATED APPLICATIONS

The following applications, filed concurrently with the subject application, are related to the subject application and are hereby incorporated by reference in their entirety: application no. unknown entitled METHOD FOR UPDATING SECRET SHARED DATA IN A WIRELESS COMMUNICATION SYSTEM by the inventor of the subject application; application no. unknown entitled METHOD FOR TRANSFERRING SENSITIVE INFORMATION USING INTIALLY UNSECURED COMMUNICATION by the inventor of the subject application; application no. unknown entitled METHOD FOR SECURING OVER-THE-AIR COMMUNICATION IN A WIRELESS SYSTEM by the inventor of the subject application; and application no. unknown entitled METHOD FOR ESTABLISHING A KEY USING OVER-THE-AIR COMMUNICATION AND PASSWORD PROTOCOL AND PASSWORD PROTOCOL by the inventor of the subject application and Adam Berenzweig.

BACKGROUND OF THE INVENTION

1. Field of the Invention

The present invention relates to a method for authenticating parties communicating with one another, and in one application, a method for authenticating a mobile and a network in wireless communication. The present invention further relates to a key agreement based on the authentication protocol.

2. Description of Related Art

Protocols for authenticating parties communicating with one another provide a measure of security to the communication. Several such protocols are employed by the wireless industry and form part of the different communication standards in the U.S., Europe and Japan.

While the party authentication system and method according to the present invention is not limited to wireless communication, to promote ease of understanding, the present invention will described in the context of a wireless system. For this reason, a general overview of wireless systems is presented, including a discussion of the party authentication protocol used in at least one of the standards.

The U.S. currently utilizes three major wireless systems, with differing standards. The first system is a time division multiple access system (TDMA) and is governed by IS-136, the second system is a code division multiple access (CDMA) system governed by IS-95, and the third is the Advanced Mobile Phone System (AMPS). All three communication systems use the IS-41 standard for intersystem messaging, which defines the authentication procedure for call origination, updating the secret shared data, and etc.

FIG. 1 illustrates a wireless system including an authentication center (AC) and a home location register (HLR) 10, a visiting location register (VLR) 15, and a mobile 20. While more than one HLR may be associated with an AC, currently a one-to-one correspondence exists. Consequently, FIG. 1 illustrates the HLR and AC as a single entity, even though they are separate. Furthermore, for simplicity, the remainder of the specification will refer to the HLR and AC jointly as the AC/HLR. Also, the VLR sends information to one of a plurality of mobile switching centers (MSCs) associated therewith, and each MSC sends the information to one of a plurality of base stations (BSs) for transmission to the mobile. For simplicity, the VLR, MSCs and BSs will be referred to and illustrated as a VLR. Collectively, the ACs, HLRs, VLRs, MSCs, and BSs operated by a network provider are referred to as a network.

A root key, known as the A-key, is stored only in the AC/HLR 10 and the mobile 20. There is a secondary key, known as Shared Secret Data SSD, which is sent to the VLR 15 as the mobile roams (i.e., when the mobile is outside its home coverage area). SSD is generated from the A-key and a random seed RANDSSD using a cryptographic algorithm or function. A cryptographic function is a function which generates an output having a predetermined number of bits based on a range of possible inputs. A keyed cryptographic function (KCF) is a type of cryptographic function that operates based on a key; for instance, a cryptographic function which operates on two or more arguments (i.e., inputs) wherein one of the arguments is the key. From the output and knowledge of the KCF in use, the inputs can not be determined unless the key is known. Encryption/decryption algorithms are types of cryptographic functions. So are one-way functions like pseudo random functions (PRFs) and message authentication codes (MACs). The expression $KCF_{SK}(R_N')$ represents the KCF of the random number $R_N'$ using the session key SK as the key. A session key is a key that lasts for a session, and a session is a period of time such as the length of a call.

In the IS-41 protocol, the cryptographic function used is CAVE (Cellular Authentication and Voice Encryption). When the mobile 20 roams, the VLR 15 in that area sends an authentication request to the AC/HLR 10, which responds by sending that mobile's SSD. Once the VLR 15 has the SSD, it can authenticate the mobile 20 independently of the AC/HLR 10. For security reasons, the SSD is periodically updated.

FIG. 2 illustrates the communication between the AC/HLR 10, the VLR 15 and the mobile 20 to update the SSD. As discussed above, the AC/HLR 10 generates a random number seed RANDSSD, and using the CAVE algorithm generates a new SSD using the random number seed RANDSSD. The SSD is 128 bits long. The first 64 bits serve as a first SSD, referred to as SSDA, and the second 64 bits serve as a second SSD, referred to as SSDB. As shown in FIG. 2, the AC/HLR 10 provides the VLR 15 with the new SSD and the RANDSSD. The VLR 15 then sends the RANDSSD to the mobile 20 along with a session request SR. The session request SR instructs the mobile 20 to perform the SSD update protocol which is described in detail below. In response to receipt of the RANDSSD and the session request SR, the mobile 20 uses the CAVE algorithm to generate the new SSD using the RANDSSD, and generates a random number $R_m$ using a random number generator. The mobile sends the random number $R_m$ to the VLR 15. The mobile 20 also performs the CAVE algorithm on the random number $R_m$ using the new SSDA as the key. This calculation is represented by $CAVE_{SSDA}(R_M)$.

One of the VLR 15 and the AC/HLR 10, also calculates $CAVE_{SSDA}(R_M)$, and sends the result to the mobile 20. The mobile 20 authenticates the network if $CAVE_{SSDA}(R_M)$, which it calculated, matches that received from the network.

Next, and usually after receiving a signal from the mobile 20 indicating verification, the VLR 15 generates a random number $R_N$, and sends the random number $R_N$ to the mobile 20. Meanwhile, the VLR calculates $CAVE_{SSDA}(R_N)$. Upon receipt of $R_N$, the mobile 20 calculates $CAVE_{SSDA}(R_N)$, and sends the result to the VLR 15. The VLR 15 authenticates the mobile if $CAVE_{SSDA}(R_N)$, which it calculated, matches that received from the mobile 20. The random numbers $R_M$ and $R_N$ are referred to as challenges, while $CAVE_{SSDA}(R_M)$ and $CAVE_{SSDA}(R_N)$ are referred to as challenge responses. Once the authentication is complete, the mobile 20 and the network generate session keys using SSDB.

In this protocol, the SSD is itself used to answer the challenges from the mobile 20 and the network. This allows an attack when an old RANDSSD and SSD pair are revealed. Knowing this pair is enough to query the mobile 20, and answer its challenge. Thus an attacker can issue an SSD update to the mobile 20, and answer the challenge from the mobile. Once the revealed SSD is accepted, and despite a secure session key agreement protocol (i.e., a protocol on communication between a mobile and a network to establish a session key), the attacker can impersonate the network and place a call to the mobile 20 under fraudulent identities. For example, the impersonator can insert his own caller id or name and pretend to be someone else. The attacker can pretend to be a credit card company, and ask to verify card number and pin. Or even use the telephone company name in the caller name field and ask to verify calling card numbers, etc.

SUMMARY OF THE INVENTION

In a two party authentication method according to the present invention a first party issues a random number as a first challenge, and a second party responds with a first challenge response. The first challenge response is generated by performing a keyed cryptographic function (KCF) on the first challenge and a count value using a first key. The second party increments the count value upon receipt of the first challenge, and uses the count value as a second challenge. The first party verifies the second party based on the first challenge and receipt of the second challenge and the first challenge response. After verification, the first party performs the KCF on the second challenge using the first key to generate a second challenge response. Based on the second challenge and receipt of the second challenge response, the second party verifies the first party. Using the first and second challenges, an encryption key is generated by both parties. In this manner, a different key, the first key, from the encryption key is used in answering challenges. The present invention has many applications including the wireless industry wherein the first and second parties are a network and mobile, respectively.

BRIEF DESCRIPTION OF THE DRAWINGS

The present invention will become more fully understood from the detailed description given below and the accompanying drawings which are given by way of illustration only, wherein like reference numerals designate corresponding parts in the various drawings, and wherein:

FIG. 1 is a block diagram illustrating the basic components of a wireless system;

FIG. 2 illustrates the communication between the authentication center/home location register, visiting location register, and the mobile to update the secret shared data according to the IS-41 standard; and FIG. 3 illustrates the communication between the network and the mobile to authenticate these two parties according to one embodiment of the present invention.

DETAILED DESCRIPTION OF THE PREFERRED EMBODIMENTS

As discussed above, while the party authentication system and method according to the present invention is not limited to wireless communication, to promote ease of understanding, the present invention will described in the context of a wireless system. More specifically, the method or protocol for two party authentication according to the present invention will be described as employed by the wireless system shown in FIG. 1.

In contrast to the method or protocol discussed above with respect to FIGS. 1 and 2, in the method according to the present invention, the AC/HLR 10 and the mobile 20 also generate another key, referred to as the M-key, based on the A-key. For example, the M-key is generated by applying a pseudo random function (PRF) indexed by the A-key on a value known to the network and the mobile 20. A practical PRF is the well-known Data Encryption Standard-Cipher Block Chaining (DES-CBC) algorithm from NIST (National Institute of Standards). In a preferred embodiment, DES-CBC, indexed by the 64-bit A-key on a known value, produces a 64-bit M-key.

FIG. 3 illustrates the communication between the network and the mobile 20 to authenticate these two parties according to one embodiment of the present invention. As shown, the VLR 15 acts as a conduit for communication between the AC/HLR 10 and the mobile 20. More specifically, the authentication protocol according to the present invention is performed between the AC and the mobile 20.

As shown, one party, the AC/HLR 10, generates and sends a random number $R_N$ to the other party, the mobile 20. Typically, the AC/HLR 10, in addition to sending the random number $R_N$, sends a session request SR specifying the type of protocol to be performed. Protocol types include, for example, call origination, secret shared data (SSD) update, call termination, and mobile registration.

In response, the mobile 20 generates a count value $C_M$, and performs a KCF on the random number $R_N$, the count value $C_M$, Type data, and id data $ID_M$ using the M-key as the key. This calculation is represented a $KCF_{M-Key}$(Type, $ID_M$, $C_M$, $R_N$). Preferably, the KCF is a keyed message authentication code such as HMAC, but could be a PRF such as DES-CBC. The mobile 20 includes a counter which generates the count value $C_M$. The mobile 20 increments the count value $C_M$ prior to generating the challenge response (i.e., $KCF_{M-Key}$(Type, $ID_M$, $C_M$, $R_N$)) to each challenge from the network.

The Type data represents the type of protocol being performed. The id data indicates that the communication issued from the mobile. Usually, id data 1 indicates that the communication is from the network, and id data 0 indicates that the communication came from the mobile. For the purposes of discussion, however, the id data for the mobile 20 is shown as $ID_M$ and the id data for the network is shown as $ID_A$. The system and method for two party authentication does not require the inclusion of the Type data when performing the KCF on the random number $R_N$ and the count value $C_M$. The Type data and the specific id data have been included as part of the application of the two party authentication method and system to a wireless system.

The mobile 20 sends count value CM and $KCF_{M-Key}$ (Type, $ID_M$, $C_M$, $R_N$) to the network. Because the AC/HLR 10 initiated the current protocol including the two party authentication protocol according to the present invention, the AC/HLR 10 knows the Type data. Also, because communication from mobiles include the same id data, this value is known by the AC/HLR 10 as well. Accordingly, based on the received count value $C_M$, the AC/HLR 10 calculates $KCF_{M-Key}$(Type, $ID_M$, $C_M$, $R_N$) and determines whether this calculated value matches the version received from the mobile 20. If a match is found, the AC/HLR 10 authenticates the mobile 20.

Once the mobile 20 has been verified, the AC/HLR 10 calculates $KCF_{M\text{-}Key}(Type, ID_N, C_M)$, and sends the calculated result to the mobile 20. The mobile 20, meanwhile, calculates $KCF_{M\text{-}Key}(Type, ID_N, C_M)$ as well. The mobile 20 then verifies whether the calculated version of $KCF_{M\text{-}Key}(Type, ID_N, C_M)$ matches the version received from the AC/HLR 10. If a match is found, the mobile 20 authenticates the network.

Furthermore, after performing this two party authentication protocol, other keys can be generated. For instance, if the wireless system of FIG. 1 used this two party authentication protocol as part of the SSD update protocol, then, after the mobile 20 authenticates the network, the mobile 20 and the AC/HLR 10 both have the random number $R_N$ and the count value $C_M$. Both the mobile 20 and AC/HLR 10 generate the SSD as $PRF_{A\text{-}Key}(C_M, R_N)$; wherein the PRF is preferably the DES-CBC algorithm. Alternatively, in other protocols, this same technique is used to generate other keys.

When applied to a wireless system, the mobile 20 needs to store the count value $C_M$ in semi-permanent memory so that during power down, the count value $C_M$ is not reinitialized. This way, repetition of a count value is prevented; repetition of the count value permits an attacker to prevail in his attack. In a preferred embodiment, the count value is initialized using a random number and generated using a large bit counter such as a 64 or 75 bit counter. This provides security even when the mobile 20 crashes and loses the stored count value. Even if an attacker can cause a mobile to crash at will, and assuming it takes at least a second to initiate a session, it will take, for example, a year before the attacker manages to have the mobile repeat a count value when a 75 bit counter is used.

As a further alternative, instead of a sending a unique random number $R_N$, the initiating party (e.g., the network) issues a global random number. Namely, for each communication, the initiating party issues a different, unique random number $R_N$ in the embodiment of FIG. 3. However, in this alternative embodiment, the initiating party issues the same random number $R_N$ for each communication.

In the protocol according to the present invention the key previously established between the parties (e.g., A-key or SSD) is not used to answer challenges, and thus the network impersonation problem discussed with respect to IS41 is not possible. Furthermore, even if the M-key is revealed to an attacker, there is no direct way to obtain the A-key therefrom because a one-way function was used to generate the M-key. Because an attacker uses prior challenges and challenge responses when mounting an attack, such an attack will fail if made on the protocol according to the present invention. The reason is that the attacker will be using a challenge response based on an old count value. Consequently, the network will not verify the attacker. Further, keys generated after authentication as discussed above will be generated by the PRF of the new challenge using the A-key, and the attacker does not know the A-key.

The invention being thus described, it will be obvious that the same may be varied in many ways. Such variations are not to be regarded as a departure from the spirit and scope of the invention, and all such modifications are intended to be included within the scope of the following claims.

What is claimed:

1. A method for authenticating a first party at a second party, comprising:
   (a) receiving a random number from said first party as a first challenge;
   (b) incrementing a count value in response to receiving said first challenge;
   (c) generating a first challenge response by performing a keyed cryptographic function (KCF) on said first challenge and said count value using a first key;
   (d) transferring said count value, as a second challenge, and said first challenge response to said first party;
   (e) receiving a second challenge response from said first party, said second challenge response being a result of performing said KCF on said second challenge using said first key; and
   (f) verifying said first party based on said second challenge and said second challenge response, wherein
   said first party is a network of a wireless system and said second party is a mobile, and
   said step (c) generates said first challenge response by performing said KCF on said first challenge, said count value and type data using said first key, said type data indicating a type of protocol being performed by said network and said mobile.

2. The method of claim 1, prior to said step (c), further comprising:
   (g) generating said first key using a root key.

3. The method of claim 1, wherein said step (c) generates said first challenge response by performing said KCF on said first challenge, said count value, and an identifier for said second party using said first key.

4. The method of claim 1, further comprising:
   (g) establishing a second key based on said first and second challenges.

5. The method of claim 1, wherein said step (a) receives a global challenge as said first challenge from said first party.

6. The method of claim 1, wherein said step (c) generates said first challenge response by performing said KCF on said first challenge, said count value, an identifier for said mobile, and type data using said first key.

7. The method of claim 1, further comprising:
   (g) establishing a second key based on said first and second challenges.

8. The method of claim 7, wherein said second key is one of secret shared data and a session key.

9. The method of claim 1, wherein said step (b) increments said count value using a bit counter of greater than 64 bits and which was initialized using a random number.

10. A method for authenticating a first party at a second party, comprising:
    (a) outputting a random number as a first challenge;
    (b) receiving a second challenge and a first challenge response from said first party, said second challenge being a count value, and said first challenge response being a result of performing a keyed cryptographic function (KCF) on said first challenge and said count value using a first key;
    (c) verifying said first party based on said first challenge, said second challenge, and said first challenge response;
    (d) generating a second challenge response by performing said KCF on said second challenge using said first key; and
    (e) transferring said second challenge response to said second party, wherein
    said first party is a mobile of a wireless system and said second party is a network, and
    said step (c) generates said second challenge response by performing said KCF on said second challenge and type data using said first key, said type data indicating a type of protocol being performed by said network and said mobile.

11. The method of claim 10, further comprising:

(c) establishing a second key based on said first and second challenges.

12. The method of claim 10, wherein said step (a) outputs said first challenge as a global challenge.

13. The method of claim 10, wherein said first party is a mobile of a wireless system and said second party is a network.

14. The method of claim 13, further comprising:

(c) establishing a second key based on said first and second challenges.

15. The method of claim 14, wherein said second key is one of secret shared data and a session key.

16. The method of claim 10, wherein said step (c) generates said second challenge response by performing said KCF on said second challenge and an identifier for said second party using said first key.

17. The method of claim 10, wherein said step (c) generates said second challenge response by performing said KCF on said second challenge, an identifier for said network, and type data using said first key.

* * * * *